United States Patent [19]
Humbert

[11] 3,901,094
[45] Aug. 26, 1975

[54] COMPENSATOR DEVICE FOR WHEEL ALIGNING APPARATUS

[76] Inventor: Marvin H. Humbert, 2300 Meadowlane, NE, Cedar Rapids, Iowa 52402

[22] Filed: Sept. 21, 1973

[21] Appl. No.: 399,634

[52] U.S. Cl. .................. 74/89.15; 33/336
[51] Int. Cl. ............................ F16h 27/02
[58] Field of Search ......... 33/336, 337; 280/96.2 A, 280/96.2 B; 74/89.15; 248/282, 284, 486; 151/70; 85/46

[56] References Cited
UNITED STATES PATENTS

| | | | |
|---|---|---|---|
| 2,010,525 | 8/1935 | Mc Hugh | 151/70 |
| 2,445,602 | 7/1948 | Casaroll | 85/46 |
| 2,581,630 | 1/1952 | Carrigan | 33/336 |
| 3,445,936 | 5/1969 | Wilkerson | 33/336 |
| 3,555,916 | 1/1971 | Santy | 74/89.15 |
| 3,758,958 | 9/1973 | Jordan | 33/336 |

Primary Examiner—Wesley S. Ratliff, Jr.

[57] ABSTRACT

A compensator device for wheel aligning apparatus which allows adjustment of relationship between a wheel and an indicator device in two planes mutually at right angles to each other, as for example, for adjusting the camber and caster of the wheel. The mechanism is constructed so as to substantially remove all backlash and has a pair of thumb screws which allow easy adjustment of the compensator in two planes.

8 Claims, 5 Drawing Figures

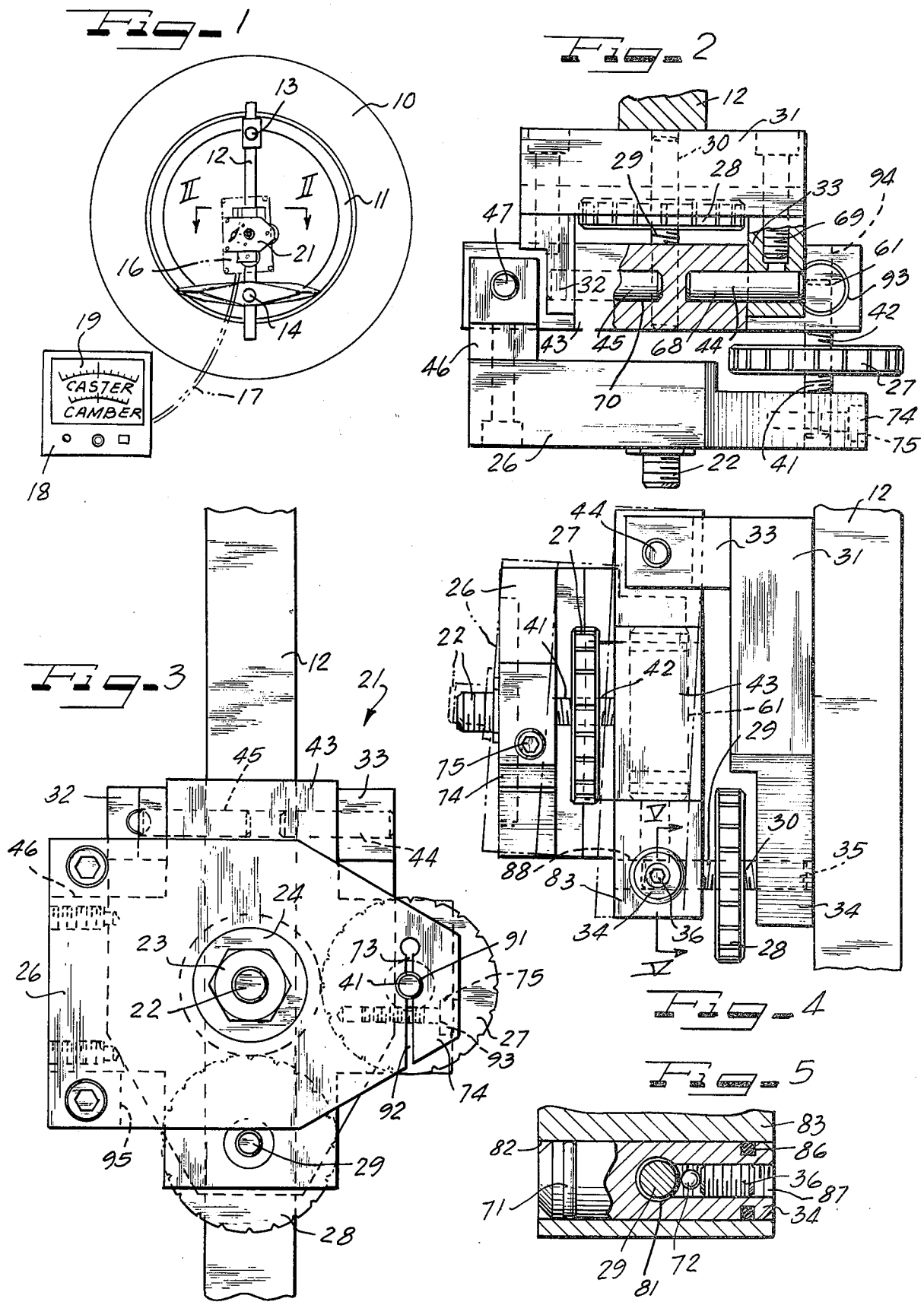

COMPENSATOR DEVICE FOR WHEEL ALIGNING APPARATUS

BACKGROUND OF THE INVENTION

1. Field of the Invention

This invention relates in general to compensator devices for wheel aligning apparatus and in particular to a novel compensator adjustable in two planes at right angles to each other.

2. Description of the Prior Art

In order to take necessary measurements needed to make corrective adjustments on caster, camber and toe requirements of wheels it is necessary to compensate for lateral run out of the wheel before setting the correct camber and caster angles. This has been a very difficult setting in the past.

SUMMARY OF THE INVENTION

The present invention comprises a compensating device which is to be mounted between a wheel rim clamp and a detector for adjusting camber, caster and making other adjustments on a wheel. A pair of thumbscrews are conveniently mounted so that the user can move the compensator to adjust about axes perpendicular to each other and which provide for minimum back lash in the compensating mechanism.

Other objects, features, and advantages of the invention will be readily apparent from the following description of certain preferred embodiments thereof taken in conjunction with the accompanying drawings although variations and modifications may be effected without department from the spirit and scope of the novel concepts of the disclosure and in which:

BRIEF DESCRIPTION OF THE DRAWINGS

FIG. 1 is a side plan view illustrating the compensator of this invention mounted on a wheel;

FIG. 2 is a partially cut away top plan view of the compensator of the invention;

FIG. 3 is a side plan view of the compensator of the invention;

FIG. 4 is a front plan view of the invention; and

FIG. 5 is a detailed sectional view taken along line V—V from FIG. 4.

DESCRIPTION OF THE PREFERRED EMBODIMENTS

FIG. 1 illustrates a tire 10 mounted on a wheel 11 to which a wheel rim clamp 12 is attached by thumbscrews 13 and 14. The wheel rim clamp 12 is a standard item and provides means for attaching a sensing unit 16 to the wheel. The sensing unit 16 provides an output cable 17 to an indicator 18 that has scales for reading angular adjustments as for example, camber and caster. Between the sensing unit 16 and the clamp 12 is mounted the compensating unit 21 of this invention.

The compensator unit is formed of three plates 31, 43 and 26 which are generally mounted in parallel arrangement with the plate 31 being attached to the bracket member 12 as shown in FIGS. 2, 3 and 4 and has a pair of extensions 32 and 33 which provide pivotal support for the plate 43. A pair of pivot pins 44 and 45 extend through the support members 32 and 33 and into openings 68 and 70 formed in the upper portion of the plate 43. A thumbscrew 28 has a pair of threaded shafts 29 and 30 which extend from opposite sides thereof and is threadedly received in an opening 35 in a lower portion of the plate 31 and into a threaded opening 81 formed through a cylindrical member 34 which is received in an opening 82 which is formed in the member 43 at the lower end 83 thereof.

As shown in detail in FIG. 5, the member 34 is formed with a pair of grooves in which O-rings 71 and 86 are mounted so as to allow the member 34 to rotate relative to the member 43. A threaded opening 87 is formed in the cylindrical member 34 and receives a threaded shaft 36 which presses a plastic ball such as nylon 72 against the threads of the shaft 29 as shown in FIG. 5. It is to be noted that the arrangement including the pivot shafts 44 and 45 and the thumbscrew 28 with the threaded shafts 29 and 30 allow accurate adjustment of the angular relationship between the plate 43 and the plate 31. This is true because the shafts 29 and 30 are oppositely threaded so as to either cause the plates 43 and 31 to move toward each other at the lower end thereof or to move away from each other, depending on the direction of rotation of the thumbwheel 28. Also, the provision for allowing rotation of the cylinder 34 allows the threaded shaft 29 to adjust the angular position of the plates without being bound. It is to be realized that the transverse opening 88 which extends through the member 83 does not bind the shaft 29 as adjustment is made.

The third plate 26 is pivotally supported from plate 42 at right angles to the pivot of plate 43 relative to plate 31 by a pair of members 46 and 95 which extend outwardly from the plate 26. Pivot pin 47 extends through member 46 and into plate 43 as shown in FIG. 2 and a corresponding pin extends through member 95 and into plate 43 to provide a vertical pivot axis relative to FIG. 3 so that the plate 26 may be adjusted angularly relative to the plate 43. A second thumbwheel 27 is mounted between the plate 26 and 43 at the end opposite the pivot and has oppositely threaded shafts 41 and 42 which are threadedly received in plates 26 and 43. As shown in FIG. 3, a threaded opening 91 is formed through which the shaft 41 is received and a slot 92 is cut into the opening 91 and plate 26 and is formed with a generally circular opening 73 to allow a portion 74 of plate 26 to be adjusted by said screw 93 to tighten the threads in the opening 91 on the shaft 41. A cylindrical member 61, best shown in FIG. 2 is mounted in an opening 93 formed in plage 43 and is formed with a transversed threaded opening 94 through which the threaded shaft 42 extends. A cylindrical member 61 can be of the same general form as cylindrical member 34 illustrated in FIG. 5 and is not shown in detail since its construction is similar to that of cylindrical member 34 illustrated in FIG. 5.

The unit 16 is mounted by shaft 22 and nut 23 to a compensating unit 21 and adjustment can be made in both the horizontal and vertical plane by adjustment of the thumbwheels 27 and 28.

Substantially all of the back lash is removed in the compensator unit used due to the use of individual pins 44 and 45 and equivalent pins to pivotally support the shafts. Likewise the provision of the cylindrical members 34 and 61 prevent binding and allow adjustment since the cylindrical members can rotate relative to their plates as adjustment of the thumbwheels is made. Also, the mechanism may be easily adjusted by an operator since the thumbwheels 27, 28 are very accessible.

It is seen that the invention provides a new and novel compensator unit for adjustments as for example in caster and camber measurements and settings in an automobile and although the invention has been described with respect to preferred embodiments, it is not to be so limited as changes and modifications may be effected without departing from the intended scope as defined by the appended claims.

I claim as my invention:

1. A compensator device for adjusting the angular relationship between a pair of members in two planes mutually perpendicular to each other comprising a first plate attachable to one of said members and having an extension on one side which extends outwardly from said one of said members, a second plate pivotally attached on a first axis to said extension of said first plate along one edge thereof, a first thumbwheel with oppositely threaded shafts extending from opposite sides thereof threadedily received through first and second plates adjacent second edges thereof, a third plate formed with an extension which is pivotally attached on a second axis to said second plate along a third edge with said second axis being perpendicular to said first axis, a second thumbwheel with oppositely threaded shafts extending from opposite sides thereof threadedily received through said second and third plates adjacent fourth edges thereof, and said third plate attachable to the other one of said pair of members.

2. A compensator device according to claim 1 including a first cylindrical member rotatably supported by said second plate on a third axis parallel to said first axis and formed with a threaded opening transverse to said first and third axes through which one of said threaded shafts of said first thumbwheel is received.

3. A compensator device according to claim 2 including a second cylindrical member rotatably supported by said second plate on a fourth axis at right angles to said first axis and formed with a threaded opening transverse to said fourth axis through which one of said threaded shafts of said second thumbwheel is received.

4. A compensator device according to claim 3 including a threaded opening formed in said first cylindrical member parallel to said third axis, and a friction member mounted in said threaded opening and biased against said one threaded shaft of said first thumbwheel.

5. A compensator device according to claim 4 wherein said friction member is a plastic ball and a threaded set screw receivable in said threaded opening to bias said ball against said one threaded shaft of said first thumbwheel.

6. A compensator device according to claim 3 wherien said first and second cylindrical members are formed with annular grooves, and flexible O-rings mounted in said grooves.

7. A compensator device according to claim 1 wherein a slot is cut in said third plate and said threaded shaft of said second thumbwheel extending transversely through said slot.

8. A compensator device according to claim 7 wherein a locking screw is mounted in said third plate transversely of said slot to tighten said third plate relative to said threaded shaft.

* * * * *